(12) United States Patent
Reichel et al.

(10) Patent No.: US 11,803,014 B2
(45) Date of Patent: Oct. 31, 2023

(54) MONOLITHIC FABRY-PEROT FIBRE MICROCAVITY WITH A HIGH LEVEL OF PASSIVE STABILITY

(71) Applicants: SORBONNE UNIVERSITE, Paris (FR); CENTRE NATIONAL DE LA RECHERCHE SCIENTIFIQUE (CNRS), Paris (FR); ECOLE NORMALE SUPERIEURE, Paris (FR)

(72) Inventors: Jakob Reichel, Le Plessis Robinson (FR); Romain Long, Vincennes (FR)

(73) Assignees: SORBONNE UNIVERSITE, Paris (FR); CENTRE NATIONAL DE LA RECHERCE SCIENTIFIQUE (CNRS), Paris (FR); ECOLE NORMALE SUPERIEURE, Paris (FR)

( * ) Notice: Subject to any disclaimer, the term of this patent is extended or adjusted under 35 U.S.C. 154(b) by 0 days.

(21) Appl. No.: 17/759,532

(22) PCT Filed: Jan. 29, 2021

(86) PCT No.: PCT/FR2021/050172
§ 371 (c)(1),
(2) Date: Jul. 27, 2022

(87) PCT Pub. No.: WO2021/152272
PCT Pub. Date: Aug. 5, 2021

(65) Prior Publication Data
US 2023/0075901 A1     Mar. 9, 2023

(30) Foreign Application Priority Data
Jan. 29, 2020   (FR) .................................... 2000891

(51) Int. Cl.
*G02B 6/25*     (2006.01)
*G02B 6/293*    (2006.01)
(Continued)

(52) U.S. Cl.
CPC ........... *G02B 6/29359* (2013.01); *G02B 6/25* (2013.01); *G02B 6/29398* (2013.01);
(Continued)

(58) Field of Classification Search
CPC ...... G02B 6/25; G02B 6/262; G02B 6/29359; G02B 6/29398; G02B 6/3801; G02F 1/213
See application file for complete search history.

(56) References Cited

U.S. PATENT DOCUMENTS 4,861,136 A *  8/1989  Stone .................... H04B 10/50
                                                      359/578
5,212,745 A *  5/1993  Miller .................... G02B 6/241
                                                      385/75
(Continued)

FOREIGN PATENT DOCUMENTS

| CN | 102374874 A | 3/2012 |
| CN | 105136358 A | 12/2015 |
| CN | 110632704 A | 12/2019 |

OTHER PUBLICATIONS

Dominguez-Flores et al., "Real-Time Temperature Sensor Based on In-Fiber Fabry-Perot Interferometer Embedded in a Resin", IEEE, Journal of Lightwave Technology, vol. 37, No. 4, Feb. 15, 2019, pp. 1084-1090.
(Continued)

*Primary Examiner* — Ryan A Lepisto
(74) *Attorney, Agent, or Firm* — Thomas | Horstemeyer, LLP

(57) ABSTRACT

Optical system comprising two optical fibres which are configured to define between them a Fabry-Perot cavity, and
(Continued)

a connecting element bonded to each of the two optical fibres, the connecting element defining a through-passage, at least one of the two optical fibres comprising an end portion arranged in the through-passage and bonded to the connecting element, the two optical fibres extending along an axis and being separated from one another by a distance Le parallel to the axis, one of the optical fibres being bonded to the connecting element at a first bonding zone, and the other optical fibre being bonded to the connecting element at a second bonding zone separated from the first bonding zone by distance parallel to the axis.

10 Claims, 2 Drawing Sheets

(51) Int. Cl.
  *G02B 6/38* (2006.01)
  *G02F 1/21* (2006.01)
  *G02B 6/26* (2006.01)
(52) U.S. Cl.
  CPC ........... *G02B 6/3801* (2013.01); *G02F 1/213* (2021.01); *G02B 6/262* (2013.01)

(56) References Cited

U.S. PATENT DOCUMENTS

| | | | | |
|---|---|---|---|---|
| 5,345,519 | A * | 9/1994 | Lu ........................... | G01L 1/242 385/38 |
| 5,375,181 | A * | 12/1994 | Miller ................ | G02B 6/29395 385/27 |
| 6,438,288 | B1 * | 8/2002 | Tehrani .............. | G02B 6/29398 385/27 |
| 6,445,838 | B1 * | 9/2002 | Caracci .............. | G02B 6/29359 385/27 |
| 6,687,011 | B1 * | 2/2004 | Lee ....................... | G01D 5/266 356/519 |
| 6,904,206 | B2 * | 6/2005 | Bao ....................... | G02B 6/262 385/38 |
| 6,915,048 | B2 * | 7/2005 | Kersey .............. | G02B 6/29359 385/13 |
| 8,035,822 | B2 * | 10/2011 | Riza ..................... | G01B 9/0209 356/519 |
| 11,048,047 | B1 * | 6/2021 | Erskine .............. | G02B 6/29358 |

OTHER PUBLICATIONS

Fusiek et al., "Design of a highly accurate optical sensor system for pressure and temperature monitoring in oil wells", IEEE, 12MTC 2009—International Instrumentation and Measurement Technology Conference, Singapore, May 5-7, 2009, pp. 574-578.
Gulati et al., "Fiber cavities with integrated mode matching optics", Scientific Reports, vol. 7, No. 5556, 2017, pp. 1-6.
Hunger et al., "A fiber Fabry-Perot cavity with high finesse", New Journal of Physics, vol. 12, No. 065038, 2010, 23 pages.
Hunger et al., "Laser micro-fabrication of concave, low roughness features in silica", AIP Advances, vol. 2, 2012, pp. 012119-1-012119-6.
International Preliminary Report on Patentability received for PCT Patent Application No. PCT/FR2021/050172, dated Aug. 11, 2022, 17 pages (9 pages of English Translation and 8 pages of Original Document).
International Search Report and Written Opinion received for PCT Patent Application No. PCT/FR2021/050172, dated Apr. 21, 2021, 21 pages (10 pages of English Translation and 11 pages of Original Document).
Ott et al., "Millimeter-long fiber Fabry-Perot cavities", Optics Express, vol. 24, No. 9, #261274, 2016, 15 pages.
Preliminary Research Report received for French Application No. 2000891, dated Sep. 22, 2020, 6 pages (1 page of French Translation Cover Sheet and 5 pages of original document).
Vlugter et al., "Local tuning of fused silica thermal expansion coefficient using femtosecond laser", Physical Review Materials, vol. 3, 2019, pp. 053802-1-053802-8.
Wang et al., "Multiplexed Fiber-Optic Pressure and Temperature Sensor System for Down-Hole Measurement", IEEE Sensors Journal, vol. 8, No. 11, Nov. 1, 2008, pp. 1879-1883.
Wang et al., "Self-Calibrated Interferometric-Intensity-Based Optical Fiber Sensors", IEEE, Journal of Lightwave Technology, USA, vol. 19, No. 10, Oct. 1, 2001, pp. 1495-1501.

* cited by examiner

[Fig. 1]
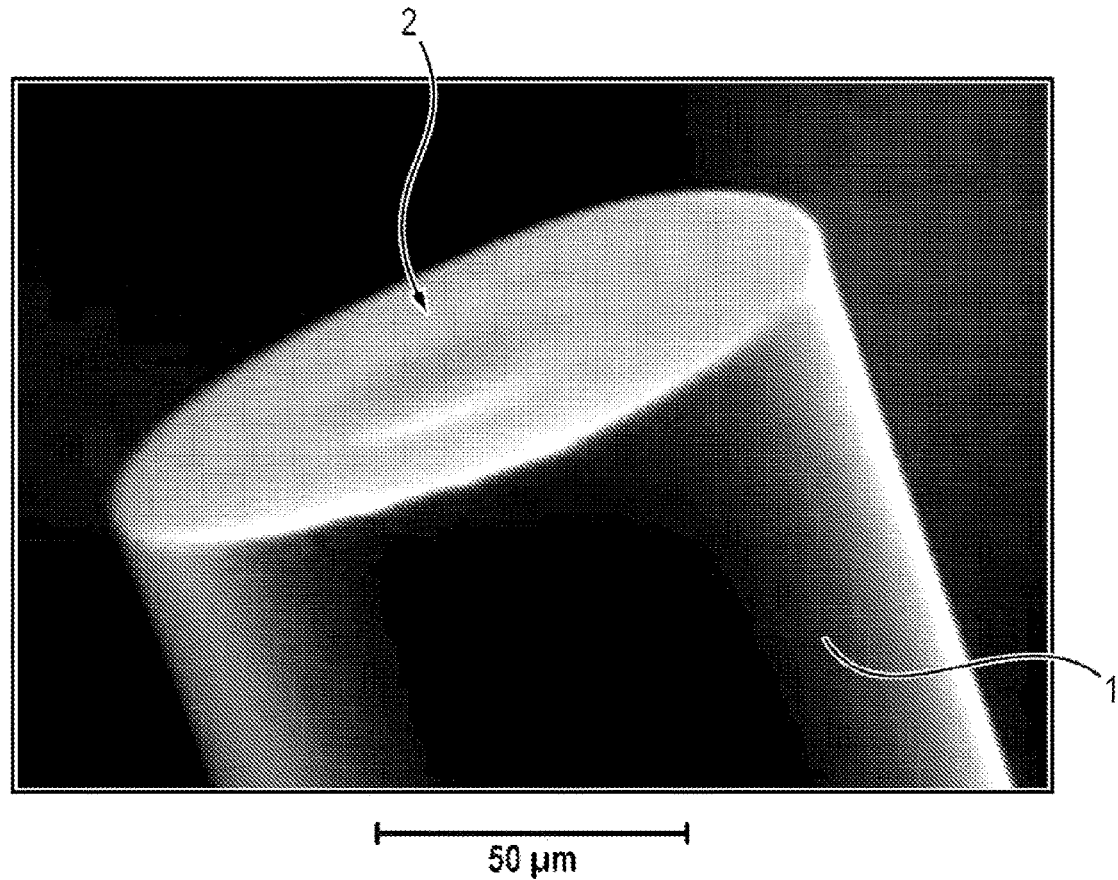
[Fig. 2]
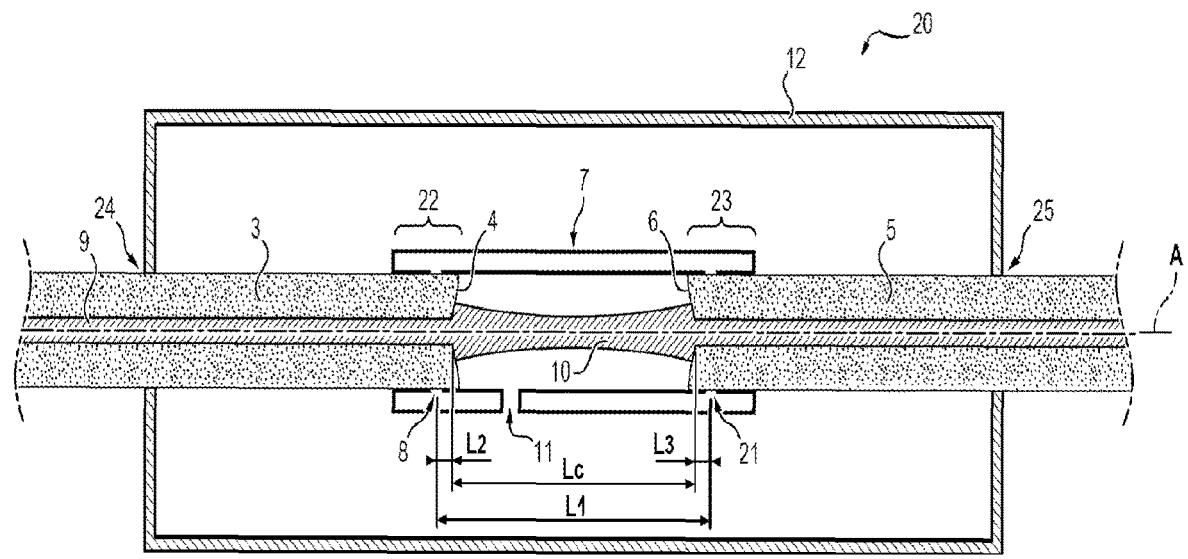

[Fig. 3]
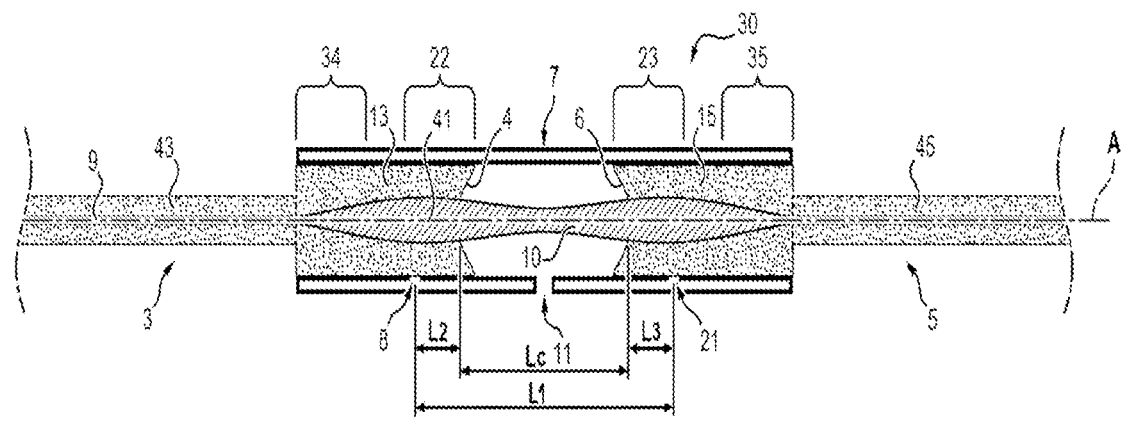
[Fig. 4]
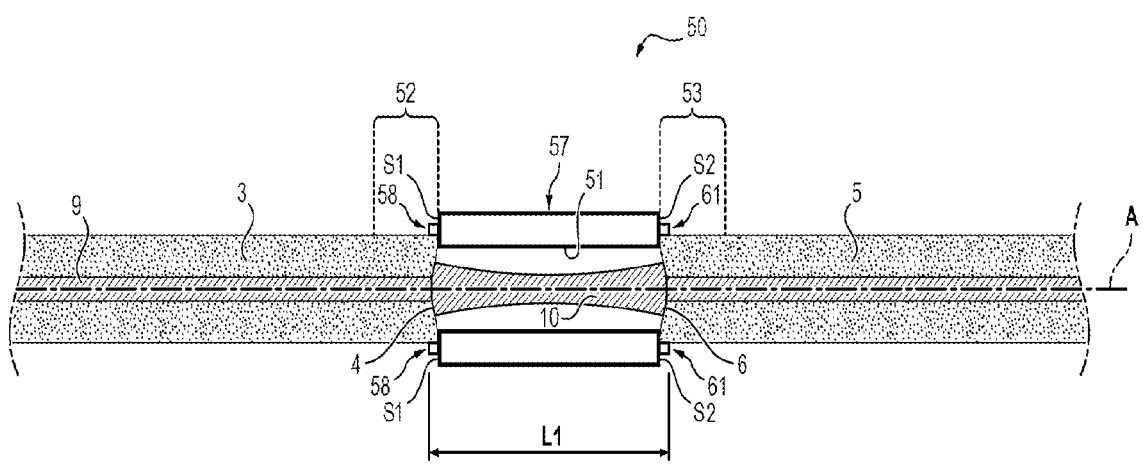

MONOLITHIC FABRY-PEROT FIBRE MICROCAVITY WITH A HIGH LEVEL OF PASSIVE STABILITY

FIELD OF THE INVENTION

The present invention relates to the field of Fabry-Perot fibre cavities.

PRIOR ART

A Fabry-Perot cavity can be formed between the ends of two optical fibres facing each other. This is called a Fabry-Perot "fibre" cavity. The facing ends are treated to form high-reflectivity mirrors.

It is known, in particular, to subject the end of one or both optical fibres to irradiation by a CO2 power laser in order to model the surface transverse to the axis of the fibre by laser ablation, as described for example in the documents "A fiber Fabry-Perot cavity with high finesse, New J. Phys. 12, 065038 (2010)" and "*Laser micro-fabrication of concave, low roughness features in silica*" AIP Advances 2, 012119 (2012) and "Millimeter-long fiber Fabry-Perot cavities", Opt. Express 24, 261274 (2016).

This laser treatment gives the fibre end desired shapes with a low deviation and very low surface roughness.

FIG. 1 shows an end of a fibre 1 machined by this method. In this case, the surface 2 transverse to the axis of the fibre has a depression at its centre which has been obtained during the laser treatment.

The importance of these Fabry-Perot fibre cavities resides in the high finesse values, in the miniature size of the cavity—this is called a Fabry-Perot microcavity —, in the high immunity to vibrations of the cavity and in the coupling of the cavity to a fibre which is given by the construction itself of the cavity.

However, for certain applications, Fabry-Perot cavities such as can be manufactured by the prior art techniques do not have sufficient stability, in particular with respect to temperature fluctuations.

DISCLOSURE OF THE INVENTION

A general object of the invention is to propose a more stable fibre Fabry-Perot cavity.

The object is achieved in the framework of the present invention through an optical system comprising two optical fibres configured to define between them a Fabry-Perot cavity, and a connecting element welded to each of the two optical fibres.

The attachment of the two optical fibres 3 and 5 by a single element and by using a welding technique increases the stability of the Fabry-Perot cavity with respect to thermal variations.

Such an optical system is advantageously completed by the various following features or steps, taken alone or in combination:
  the connecting element is a single piece;
  the two optical fibres extend along an axis, and at least one of the two optical fibres and the connecting element has a shape that is invariant under rotation through a predefined angle about the axis, for example a rotationally symmetric shape;
  the two optical fibres and the connecting element are designed so that:

$$\frac{\Delta L_c}{L_c \Delta T} < 10^{-6} K^{-1} \qquad \text{[Math. 1]}$$

where $\Delta T$ is a temperature variation undergone by the optical system, $\Delta L_c$ is a variation in a first distance Lc separating the two optical fibres parallel to the axis and constituting a length of the Fabry-Perot cavity, caused by a thermal deformation of the optical system under the effect of the temperature variation $\Delta T$;
  the connecting element defines a through-passage, at least one of the two optical fibres comprising an end portion arranged in the through-passage and welded to the connecting element;
  the two optical fibres extend along an axis, and are separated from one another by a distance Lc parallel to the axis, one of the optical fibres is welded to the connecting element in a first welding zone, and the other optical fibre is welded to the connecting element in a second welding zone separated from the first welding zone by a distance L1 parallel to the axis, and wherein the two optical fibres have a first thermal expansion coefficient, and the connecting element has a second thermal expansion coefficient, so that the first thermal expansion coefficient is equal to the product of the second thermal expansion coefficient multiplied by the term (1−Lc/L1) to within a margin of $10^{-6}$;
  the connecting element has a first surface and a second surface opposite the first surface, and defines a through-passage opening on the first surface and on the second surface, in which at least one of the optical fibres comprises an end portion welded to one among the first surface and the second surface;
  the connecting element has a thermal expansion coefficient less than $10^{-6}$ K;
  the Fabry-Perot cavity is sealed;
  the optical system comprises a housing arranged around and at a distance from the connecting element so as to define between them, a sealed peripheral cavity limiting the pressure variations and/or temperature variations inside the Fabry-Perot cavity, or making it possible to form a vacuum in the peripheral cavity, or making it possible to fill the peripheral cavity with a well-defined gas.

The invention also relates to a method for manufacturing an optical system such as that described above, the method comprising a step of ablation of one of the two optical fibres, the ablation being carried out by a $CO_2$ laser, using a focused ion beam or by a chemical treatment.

Advantageously, but optionally, the method can be supplemented by depositing, on at least one of the two optical fibres, a coating layer suitable for increasing the optical reflectivity of the optical fibre, the coating layer delimiting, after deposition, the Fabry-Perot cavity.

DESCRIPTION OF THE FIGURES

Other features and advantages of the invention will emerge from the following description, which is given purely by way of illustration and not being limiting and which should be read with reference to the attached drawings, in which:
  FIG. 1, already discussed, is a schematic representation of a fibre end machined by laser ablation;

FIGS. 2, 3 and 4 are schematic representations of a Fabry-Perot fibre cavity according to two aspects of the invention.

In the various figures, identical reference numbers designate the same or equivalent elements.

DETAILED DESCRIPTION OF THE INVENTION

As shown in FIG. 2, an optical system 20 is proposed, comprising a first optical fibre 3 and a second optical fibre 5.

Optical Fibres

Optical fibre is understood to mean a fibre capable of conducting light, for example a fibre for which the central part or core is able to conduct light. The optical fibre comprises two ends which can be designed to interact with light sources, light receptors and other fibres and thus to receive or transmit light. The length of an optical fibre is adjustable.

The optical fibres can be of different types, for example single-mode optical fibre, multimode optical fibre, polarisation-maintaining optical fibre, gradient-index optical fibre and photonic crystal optical fibre. In particular, the optical fibres can be large-core photonic crystal optical fibres (also known as "large mode area" LMA). The optical fibres are produced from a material such as fused silica.

The first optical fibre 3, like the second optical fibre 5, extends along an axis. The two optical fibres 3 and 5 typically have a rotationally symmetric shape about their axis of extension. The two optical fibres 3 and 5 can have a shape that is invariant under rotation through a predefined angle about their axis of extension. For example, in the case of polarisation-maintaining optical fibres, the predefined angle can be 180°.

The first optical fibre 3 and the second optical fibre 5 are arranged so that their axes of extension coincide with an axis A.

The first optical fibre 3 has a first end portion 22 and a first surface 4 in this first end portion.

The second optical fibre 5 has a second end portion 23 and a second surface 6 in this second end portion.

The first surface 4 and the second surface 6 may have been previously modelled by $CO_2$ laser ablation or using a focused ion beam (FIB) or by a chemical method.

The reflexivity of the first surface 4 and of the second surface 6 can typically be increased by a multilayer dielectric system.

The first surface 4 and the second surface 6 machined and treated in this way are arranged facing each other and define a Fabry-Perot cavity between them.

Depending on the machining and treatment carried out on the surfaces 4 and 6, it is possible to obtain a Fabry-Perot cavity having a finesse greater than 200,000.

Connecting Element

The optical system further comprises a connecting element 7 attached to each of the optical fibres 3 and 5. The attachment of the connecting element 7 to the optical fibres 3 and 5 can be produced by welding.

Welding of two parts is understood to mean a permanent assembly of these two parts. During the welding, a continuity of nature is established between the welded parts. The term weld is used to designate the alloy connecting the parts to be joined and formed by the fusion of the edges to be joined.

The welding can be carried out with or without the addition of a welding filler. In the case of welding without the addition of a welding filler, the weld is the result of a simple mixing of the materials of two parts.

Such a welding can be, in particular, laser welding or splicing by electric arc or filament (used in particular in fibre welders, referred to as "splicers").

The attachment locations 8, 21 of the connecting element 7 to the optical fibres 3 and 5 can be point contacts or more spread out. The attachment of the connecting element 7 to optical fibres 3 and 5 can be produced by spot welds or by one or more weld beads. A weld bead can form a closed loop around the axis A.

The connecting element 7 fixes the position of the first surface 4 and of the second surface 6, and a length Lc of the Fabry-Perot cavity measured parallel to the axis A.

The connecting element 7 is a single piece. The attachment of the two optical fibres 3 and 5 by a monolithic part can reduce the sensitivity of the Fabry-Perot cavity to mechanical vibrations. The stability of the Fabry-Perot cavity is improved.

The expressions "as a single piece" and "monolithic" qualify any object made in a single piece, or even any object made in a plurality of parts for which the mechanical properties (in particular with regard to expansion) are identical or very close, the plurality of parts having been assembled without the use of adhesive.

The choice of a weld makes it possible to increase the stability of the Fabry-Perot cavity, because the attachment does not require the addition of an additional material between the connecting element 7 and the optical fibres 3 and 5. In particular, the use is avoided of an adhesive which does not have the same thermal expansion characteristics as the fibres. In the presence of such an adhesive, a temperature variation of the optical system would give rise to stresses and movements between the fibres and the connecting element, which would ultimately vary the length of the cavity.

The connecting element 7 extends around the axis A. The connecting element 7 can have a shape that is invariant under rotation through a predefined angle about this axis A. For example, the connecting element 7 has a rotationally symmetric shape about the axis A.

The connecting element 7 is positioned with respect to the optical fibres 3 and 5 so that the axis of extension of the connecting element 7 is coincident with the axis A.

The connecting element 7 has, like the optical fibres 3 and 5, a symmetry with respect to the axis A, the attachment of the two optical fibres 3 and 5 by the connecting element 7 is more stable with respect to thermal variations and pressure variations, as well as with respect to mechanical vibrations.

Furthermore, the attachment locations or weld zones 8, 21 of the connecting element 7 to the optical fibres 3 and 5 can have a shape that is invariant under rotation through a predefined angle about the axis A. For example, the attachment locations or weld zones 8, 21 have a rotationally symmetric shape about its axis A.

Each fibre can have 3, 5 one or more weld beads in order to attach it to the connecting element 7. A weld bead can take different lengths, be closed on itself or otherwise.

A particular case is the weld bead which extends all the way around one of the end portions 22 and 23 following a path closed on itself.

$1^{st}$ Embodiment

In a first embodiment shown in FIG. 2, the optical system 20 comprises the connecting element 7 which has a tubular shape and defines a through-passage. The tube and the through-passage have a rotational symmetry with respect to the axis A. The end portions 22 and 23 are arranged inside the through-passage of the connecting element. Each of the two end portions 22 and 23 is welded to the connecting element 7.

The internal diameter of the connecting element 7 is suitable for receiving the fibre end portions 22 and 23. The internal diameter is chosen to be larger than, but also as close as possible to, the outer diameter of the fibres 3 and 5.

2$^{nd}$ Embodiment

In a second embodiment, FIG. 3 shows an optical system 30 which, like the previously presented optical system 20, comprises a connecting element 7. The optical system 30 differs from the optical system 20 in that each of the fibres 3, 5 comprises a plurality of different sections integral with one another, for example by electric arc or filament welding ("splicing"). The sections can differ in terms of their diameter and the type of fibre (single-mode, multimode fibre, gradient-index fibre, etc.). For example, in FIG. 3, the first fibre 3 comprises a first section 43 and a second section 13. The second section 13 of the first fibre 3 includes a first end portion 22 on which the mirror surface 4 is produced. The second fibre 5 includes a first section 45 and a second section 15. The second section 15 of the second fibre 3 includes a first end portion 23 on which the mirror surface 6 is produced. The attachment locations 8, 21 of the connecting element 7 to the optical fibres 3 and 5 are situated within the second sections 13 and 15.

The existence of a plurality of sections with different optical properties can make it possible to adapt the optical mode propagating in the optical mode fibres of the cavity, thus increasing the transmission and resonance of the cavity. An example of such an adaptation is described in the article G. K. Gulati et al., Fiber cavities with integrated mode matching optics, Sci. Rep. 7, 5556 (2017).

This is particularly relevant if the length of the cavity is large (longer than approximately 1 mm), since in this case the diameter of the cavity mode at the location of at least one of the mirrors 4, 5 is significantly larger than the diameter of a standard single-mode fibre (such as those used for data transmission in the field of telecommunications). For example, the second sections 13 and 15 of the fibres 3 and 5 can be a gradient-index fibres and have a core with a larger diameter than the cores of single-mode fibres. It is therefore possible to work within the fibre with larger diameter light beams in comparison with another type of fibre.

The first sections 43 and 45 of the optical fibres 3 and 5 can be of single-mode type.

The second sections 13 and 15 of the fibres 3 and 5 comprise a second end portion respectively 34 and 35, opposite the first end portion 22 and 23. The second end portions 34 and 35 can be optically connected to the first sections 43 and 45 of the fibres 3 and 5, for example by welding ("splicing").

Within the single mode first sections 43 and 45, the light beam 9 can then have a smaller diameter than the diameter of the light beam 41 within sections 13 and 15 with gradient index.

3$^{rd}$ Embodiment

In a third embodiment illustrated in FIG. 4, the optical fibres 3 and 5 have surfaces 4 and 6 and the optical system 50 comprises a connecting element 57.

The connecting element 57 can have a shape that is invariant under rotation through a predefined angle about its axis of extension. For example, the connecting element 57 has a rotationally symmetric shape about its axis of extension. The connecting element 57 is positioned with respect to the optical fibres 3 and 5 so that the axis of extension of the connecting element 57 is coincident with the axis A.

The connecting element 57 comprises a first surface S1 and a second surface S2 opposite the first surface S1. The surfaces S2 and S1 are perpendicular to the axis of extension of the connecting element 57.

The connecting element 57 defines a through-passage 51 opening on the first surface S1 and on the second surface S2. The through-passage 51 can have a rotationally symmetric shape about the axis of extension of the connecting element 57.

The width of the through-passage 51 measured transversely to the axis A is smaller than the diameter of the optical fibres 3 and 5.

The first optical fibre 3 comprises a first end portion 52 that is attached and preferably welded to the first surface S1, along the welding zone 58.

The second optical fibre 5 comprises a second end portion 53 that is attached and preferably welded to the second surface S2, along the welding zone 61.

Operation of the Optical System

In operation, a light beam is sent into one of the optical fibres 3, 5, so that a light intensity 9 passes through the optical fibre. Inside the Fabry-Perot cavity, in other words between the mirrors formed by the surfaces 4 and 6, a light beam 10 takes a geometric shape which depends, in particular, on the shape of the mirrors and their position. In the case shown in FIGS. 2, 3 and 4, the two mirrors are symmetric with respect to the geometric centre of the cavity. Under this condition, the geometric shape of the beam 10 is itself symmetric with respect to the geometric centre of the cavity. The beam 10 takes a conventional shape, pinched at its centre. The mirrors formed by the surfaces 4 and 6 may not be symmetric with respect to the geometric centre of the cavity. In this case, the geometric shape of the beam is not symmetric with respect to the geometric centre of the cavity.

In the case of the third embodiment, illustrated in FIG. 4, the width of the through-passage 51 measured transverse to the axis A is greater than the width of the light beam 10.

Cavity Length

There is a light resonance in the cavity, when the distance between the mirrors formed by the surfaces 4 and 6, in other words the length of the cavity Lc, is in a particular ratio with the wavelength of the light beam.

This light resonance condition is all the more precise the larger the finesse of the cavity. This resonance condition constitutes one of the advantages of the Fabry-Perot cavity, the Fabry-Perot cavity thus being able to play a reference role in terms of wavelength of a light beam sent into the Fabry-Perot cavity.

The length of the cavity Lc is measured along the axis A from the intersection with the axis A of the mirror formed by the first surface 4 to the intersection with the axis A of the mirror formed by the second surface 6.

For the first embodiment and the second embodiment illustrated in FIGS. 2 and 3, the length of cavity Lc is determined on the basis of the attachment of the connecting element 7 and the two optical fibres 3 and 5 and in particular the following three distances:

the distance L1 which designates the distance between the first attachment location or first welding zone 8 of the connecting element 7 to the first optical fibre 3 and the second attachment location or second welding zone 21 of the connecting element 7 to the second optical fibre 5, the distance L2 which designates the distance parallel to the axis A between the first attachment location or first welding zone 8 of the connecting element 7 to the first optical fibre 3 and the surface 4 of the first optical fibre 3, and the distance L3 which designates the distance parallel to the axis A between the second attachment location or second weld zone 21 of the connecting element 7 to the second optical fibre 5 and the surface 6 of the second optical fibre 5.

The length of the cavity Lc is expressed as a function of these three distances, in the form: Lc=L1−(L2+L3).

For the third embodiment, illustrated in FIG. 4, the cavity length Lc is substantially equal to the distance L1 which has been previously defined in the case of the first embodiment. There are principally two sources of deviation between these two values, on the one hand the depth of the concave mirror which is on the order of a micrometre and, on the other hand, the non-zero extension of the weld spots which is also on the order of a micrometre.

The distance L1 corresponds, in the case of FIG. 4, to the length of the connecting element 57 along the axis A.

Thermal Expansion of the Cavity

Regarding the choice of material of the optical fibres 3 and 5 or of the connecting element 7, 57, it is possible to choose particular thermal expansion coefficients. In general:

$\alpha 1$ designates the thermal expansion coefficient of the connecting element 7, 57, $\alpha 2$ designates the thermal expansion coefficient of the first optical fibre 3, and $\alpha 3$ designates the thermal expansion coefficient of the second optical fibre 5.

When the temperature of the optical system 20, 30, 50 varies by $\Delta T$, there is a thermal deformation of the optical system.

The distances L1, L2 and L3 vary in the following manner:

the distance L1 increases by $\Delta L1 = \alpha 1\ L1 \times \Delta T$,
the distance L2 increases by $\Delta L2 = \alpha 2\ L2 \times \Delta T$,
the distance L3 increases by $\Delta L3 = \alpha 3\ L3 \times \Delta T$.

The length of the cavity varies by $\Delta Lc$:

$\Delta Lc = \Delta L1 - (\Delta L2 - \Delta L3) = (\alpha 1\ L1 - \alpha 2\ L2 - \alpha 3\ L3) \times \Delta T$, in the first and second embodiments, and $\Delta Lc = \Delta L1 = \alpha 1\ L1\ \Delta T$, in the third embodiment.

Limitation of the Thermal Expansion of the Cavity

It is advantageous to stabilise the length of the cavity as much as possible in order not to lose the reference that is constituted by the cavity despite vibrations, temperature variations, pressure variations, etc. The resonant frequencies $\nu$ of the cavity vary as a function of the length of the cavity Lc according to the relation $\Delta Lc/Lc = \Delta\nu/\nu$, where $\Delta\nu$ is the variation of $\nu$. An effective thermal expansion coefficient of the cavity can be defined as $\alpha c = 1/Lc\ (\Delta Lc/\Delta T)$. This same coefficient also characterises the thermal drift of the resonant frequency: $1/\nu\ (\Delta\nu/\Delta T) = \alpha c$.

If it is desired to limit the variation of $\nu$ and therefore the variation in the length of the cavity Lc as a function of a temperature variation, the expression $\Delta Lc/\Delta T = \alpha 1\ L1 - \alpha 2\ L2 - \alpha 3\ L3$ should be limited in the first and second embodiments.

A first possibility consists, on the one hand, in reducing the distances L2 and L3 as much as possible, and on the other hand, in reducing $\alpha 1$ as much as possible Reducing the distances L2 and L3 as much as possible can be achieved by placing:

the attachment location or welding zone 8 of the connecting element 7 to the first optical fibre 3 as close as possible to the first surface 4 and the attachment location or welding zone 21 of the connecting element 7 to the second optical fibre 5 as close as possible to the second surface 6.

In order to reduce $\alpha 1$ as much as possible, it is possible for the connecting element to be made from a material having a coefficient of thermal expansion $\alpha 1$ less than $10^{-7}$ $K^{-1}$. A possible example is glass material with very low thermal expansion ("Ultra Low Expansion Glass"), or certain vitroceramic glasses such as "Zerodur".

A second possibility consists in making a particular choice of materials for the two optical fibres 3 and 5 and the connecting element and a particular choice of geometry of the attachment locations 8 and 21, so that $\alpha 1\ L1 - \alpha 2\ L2 - \alpha 3\ L3 = 0$.

For this, it is first of all possible to choose materials for the optical fibres 3 and 5 having the same thermal expansion coefficient $\alpha 2 = \alpha 3$, and a geometry of the attachment locations such that L2=L3.

Then, a particular choice of the length L1 is made in order to obtain the desired length of cavity Lc.

Finally, it is possible to choose a material for the connecting element 7, having a thermal expansion coefficient $\alpha 1$ complying with the equation $$\alpha 1 = (\alpha 2 L2 + \alpha 3 L3)/L1 = (2\alpha 2 L2)/L1.$$

It is also possible to reformulate this equation using the length of the cavity Lc:

$$\alpha 1 = \alpha 2(L1-Lc)/L1,\ \text{or again}\ \alpha 1/\alpha 2 = (L1-Lc)/L1\ \text{or again}$$

$$\alpha 1 = \alpha 2(1 - Lc/L1).$$

Since L1=Lc+L2+L3, it follows that $\alpha 1$ must be less than $\alpha 2 = \alpha 3$.

In the case where the optical fibres 3 and 5 are made of fused silica, the connecting element 7 must therefore have a thermal expansion coefficient less than that of fused silica.

These different equations correspond to a zero thermal variation of Lc, in other words $\alpha c = 0$. In practice, in order to obtain an $\alpha c$ value below a certain limit value $\alpha l$, $\alpha c < \alpha l$, the condition $(\alpha 1\ L1/Lc - \alpha 2\ L2/Lc - \alpha 3\ L3/Lc) < \alpha l$ must be met. If as described above, $\alpha 2$ and the lengths L1, L2 and L3 have been chosen first, the deviation $\Delta\alpha 1$ of $\alpha 1$ from its ideal value $(\alpha 2\ L2 + \alpha 3\ L3)/L1$ must met the condition $$\Delta\alpha 1 < (Lc/L1)\alpha l$$

If, for example, it is desired to achieve $\alpha c < 10^{-7}\ K^{-1}$ in the realistic case where L1=2Lc and the ideal value of $\alpha 1$ is close to that of fused silica ($\alpha 1 = 0.5 \times 10^{-6}$), then $\alpha 1$ must approach its ideal value to within 10%.

It should be noted that it is then possible to use fused silica modified by a femtosecond laser treatment for the connecting element, as described in the publication Vlugter et al, Phys. Rev. Mat. 3, 053802 (2019). This modification of the fused silica makes it possible to reduce the thermal expansion coefficient.

If it is desired to limit the variation in the length of the cavity Lc as a function of a temperature variation, the expression $\Delta Lc/\Delta T = \alpha 1\ L1$ should be limited in the third embodiment.

It is possible, for this purpose, to reduce $\alpha 1$ as much as possible, by using a material for the connecting element 57 having a thermal expansion coefficient $\alpha 1$ less than $10^{-6}$ $K^{-1}$. One possible example is glass material with very low thermal expansion (designated as Ultra Low Expansion Glass) for which the absolute value of the thermal expansion coefficient is less than $3\times10^{-8}$/K between 5 and 35 degrees Celsius (Corning ULE 7972), or certain vitroceramic glasses such as "Zerodur".

The various strategies presented above for limiting the thermal expansion are based on the adaptation of two optical fibres 3, 5 and the connecting element 7, 57 in order that $\Delta Lc/(Lc\ \Delta T)$ is less than $10^{-6}K^{-1}$.

A person skilled in the art can determine the variation $\Delta Lc/Lc$ of a Fabry-Perot cavity by measuring the shift $\Delta v$ in one of the resonant frequencies v of the Fabry-Perot cavity then applying the relation $\Delta Lc/Lc=\Delta v/v$.

A person skilled in the art can determine $\Delta v$ and v with a tuneable laser connected to a lambda meter (optical frequency meter), or with a spectrometer or even an optical spectrum analyser.

A person skilled in the art can determine the variation $\Delta T$ using a thermoelectric system such as, for example, a thermocouple or a thermistor, taking care to establish a homogeneous temperature over the entire Fabry-Perot cavity.

Sealing of the Cavity

The connecting element 7, 57 can have an orifice 11 designed to enable the introduction of gas into the Fabry-Perot cavity from outside the connecting element 7, 57. FIG. 2 shows an orifice 11 located on the body of the connecting element 7 between the surfaces 4 and 6. The connecting element 7, 57 can also have a plurality of orifices.

In this way, the gas exchanges between outside of the connecting element 7, 57 and the Fabry-Perot cavity are possible, the orifices enabling leaks of chemical species from the Fabry-Perot cavity to the outside and the introduction of chemical species into the Fabry-Perot cavity.

If, by contrast, it is desirable that the chemical composition of a gaseous mixture in the Fabry-Perot cavity does not change over time, then it is possible to produce a sealed Fabry-Perot cavity. A solution consists, for example, in using two weld beads, each extending all the way around one of the two end portions 22, 23 following a path closed on itself. The two end portions 22, 23, each being welded by a bead which entirely seals the through-passage of the connecting element 7, 57 the Fabry-Perot cavity being isolated in a sealed manner from outside of the connecting element 7, 57.

It should be noted that if the two optical fibres 3, 5 and the connecting element 7, 57 have a same thermal expansion coefficient, it is possible to produce a welding along spread zones without reducing the thermal stability of the optical system.

Such a sealed cavity can prove useful if it is necessary to work continuously with a Fabry-Perot cavity under vacuum or even filled with a very particular gaseous mixture. The sealing of the cavity can increase its stability.

Sealed Housing Around the Fabry-Perot Cavity

The optical system 20, 30, 50 can further comprise a housing 12 arranged around the connecting element 7, 57 so as to define between them a sealed peripheral cavity. This sealed peripheral cavity is located around the Fabry-Perot cavity. The housing 12 is not in contact with the connecting element. The housing 12 thus at a distance from the connecting element 7, 57 defines a non-zero volume between them.

The housing 12 is sufficiently wide to house the connecting element 7, 57 and the two end portions 22 and 23 optical fibres 3 and 5.

Orifices 24 and 25 can be arranged within the housing 12 in order to allow the passage of the fibres 3 and 5, while preserving the sealing of the volume defined between the housing 12 and the connecting element 7, 57.

Other orifices can be provided within the housing 12, for example to convey a gas that it is desired to study.

The volume defined between the housing 12 and the connecting element 7, 57 serves to attenuate or eliminate both the temperature fluctuations and pressure variations. In particular, if a vacuum is produced in the enclosure defined between the housing 12 and the connecting element 7, 57 the stability of the Fabry-Perot cavity is increased. This applies, in particular, to the stability of the cavity with respect to pressure fluctuations of the atmosphere inside the cavity.

In this way, the thermal stability of the Fabry-Perot cavity is increased.

The resulting stability of the Fabry-Perot cavity can be evaluated in terms of drift, in other words by the variation of a resonant wavelength or a resonant frequency of the cavity as a function of time. A Fabry-Perot cavity as has just been described within an optical system which includes an enclosure for thermally insulating the Fabry-Perot cavity can have a drift between 1 MHz and 100 MHz, without the need for a servo-control of the length of the cavity.

Applications

An optical system 20, 30, 50 comprising a more stable Fabry-Perot fibre cavity can be used in various applications.

Firstly, the proposed increased stability of the Fabry-Perot cavity makes it possible to envisage its use in Raman spectroscopy applications for characterising the chemical composition of a gas, without the need for a servo-control system of the length of the cavity.

The utilisation of a Fabry-Perot cavity in this application requires the Fabry-Perot cavity to be adjusted in order that it is in resonance with the Raman excitation laser, or with at least one of the molecular transitions or absorption lines of a chemical species that it is desired to detect. For a Fabry-Perot cavity of the prior art, maintaining resonance required a servo-control of the length of the cavity. It is therefore necessary to add, to the Fabry-Perot cavity, an adjustable positioning system, for example a piezoelectric system connected to one of the two mirrors. The size and cost of this positioning system as well as the servo-control limits the advantage of using a Fabry-Perot cavity according to the prior art.

Furthermore, the optical system 20, 30, 50 has another advantage for spectroscopy applications: the time for ensuring that the Fabry-Perot cavity is filled with a gas that it is desired to analyse is reduced due to the presence of an optional orifice 11. The quantity of gas necessary for the analysis is also reduced compared to a macroscopic Fabry-Perot cavity, due to its reduced volume.

The optical system 20, 30, 50 can also be used in the application of optical frequency combs. For certain applications, the production of an optical comb type optical signal requires the use of frequency filters. A Fabry-Perot cavity can play the role of such a frequency filter but under the condition that the inter-mirror distance is a less than 1 cm. The proposed Fabry-Perot cavity can fulfil this condition, in particular in the alternative which uses gradient-index fibres. Furthermore, the optical system 20, 30, 50 has the advantages of stability, miniature size, and coupling with an optical fibre by construction.

The optical system 20, 30, 50 can also be used within an absolute frequency reference system. Currently, these absolute frequency reference systems are used in the field of telecommunications such as, for example, discrete temperature-compensated Fabry-Perot cavities (in other words those for which the mirrors are not produced directly on optical fibres). The stability of these systems corresponds to a drift between 1 GHz and 10 GHz over the entire range of operating temperatures, for example between 5 and 70° C. The Fabry-Perot fibre cavity described here within an optical system which comprises an enclosure, has an equivalent or better stability, while possessing the other advantages described above, such as coupling to the fibres inherent to the system. It can therefore be installed within devices placed outdoors without going out of tune despite temperature variations.

Finally, the optical system 20, 30, 50 can act as a highly selective band-pass filter. It is known that a Fabry-Perot cavity constitutes a filter for which the bandwidths correspond to resonances. The shorter the cavity, the larger the stop band between the resonances, the higher the finesse and the narrower the bandwidths. The fibre cavities, which can reach very high values of finesse when the mirrors are manufactured by CO2 laser machining, are particularly advantageous for application as narrow bandpass filters, but the resonance frequency drifts with temperature and the vibrations of the cavities constructed according to the prior art constitutes a brake on their use. The increased stability of the optical system 20, 30, 50 makes this application possible.

Manufacturing Method

A method for manufacturing an optical system 20, 30, 50 such as has been described above comprises, in particular, the step of CO2 laser ablation of the first optical fibre 3 or the second optical fibre 5 so as to form the first surface 4 or the second surface 6. It should be noted that this step can also be carried out using a focused ion beam (FIB) or by a chemical treatment.

This step can give the surfaces 4, 6 of the fibres a desired shape. This shape of fibre end influences the spatial shape of a light beam in resonance with the Fabry-Perot cavity contained in the optical system 20, 30, 50, and the resonance conditions of a light beam with the Fabry-Perot cavity.

The manufacturing method can further comprise a step of depositing, on one of the surfaces 4, 6, at least one layer of coating suitable for increasing the optical reflexivity of the surface 4, 6. After deposition, the coating layer delimits the Fabry-Perot cavity and forms one of these mirrors.

This step makes it possible to give the surfaces 4, 6 of the fibres the reflectivity properties in order that the Fabry-Perot cavity contained in the optical system has a large finesse.

The invention claimed is:

1. Optical system comprising
    two optical fibres configured to define between the two optical fibres a Fabry-Perot cavity, and
    a connecting element welded to each of the two optical fibres,
    the connecting element defining a through-passage,
    at least one of the two optical fibres comprising an end portion arranged in the through-passage and welded to the connecting element,
    the two optical fibres extending along an axis and being separated from one another by a distance Lc parallel to the axis,
    a first of the two optical fibres being welded to the connecting element in a first welding zone, and a second of the two optical fibres being welded to the connecting element in a second welding zone separated from the first welding zone by a distance L1 parallel to the axis,
    wherein the two optical fibres have a first thermal expansion coefficient, and the connecting element has a second thermal expansion coefficient, so that the second thermal expansion coefficient is equal to the product of the first thermal expansion coefficient multiplied by the term $(1-Lc/L1)$ to within a margin of $10^{-6}$.

2. Optical system according to claim 1, wherein the connecting element is a single piece.

3. Optical system according to claim 1, wherein at least one of the two optical fibres and the connecting element have a shape that is invariant under rotation of a predefined angle about the axis.

4. Optical system according to claim 1, wherein the two optical fibres and the connecting element are designed so that $\Delta L_c/(L_c \times \Delta T) < 10^{-6}$ $K^{-1}$
where $\Delta T$ is a temperature variation undergone by the optical system, $\Delta Lc$ is a variation in the first distance Lc separating the two optical fibres parallel to the axis and constituting a length of the Fabry-Perot cavity, caused by a thermal deformation of the optical system under the effect of the temperature variation $\Delta T$.

5. Optical system according to claim 1, wherein the connecting element has a thermal expansion coefficient less than $10^{-6}$ $K^{-1}$.

6. Optical system according to claim 1, wherein the Fabry-Perot cavity is sealed.

7. Optical system according to claim 1, comprising a housing arranged around and at a distance from the connecting element so as to define between the housing and the connecting element a sealed peripheral cavity, the sealed peripheral cavity being configured—to form a vacuum in the peripheral cavity, or
    to fill the peripheral cavity with a gas, or
    to limit the pressure variations and/or temperature variations inside the Fabry-Perot cavity.

8. Method for manufacturing an optical system according to one of claims 1 to 7, the method comprising a step of ablation of one of the two optical fibres, the ablation being carried out by a $CO_2$ laser, using a focused ion beam or by a chemical treatment.

9. Manufacturing method according to claim 8, comprising depositing, on at least one of the two optical fibres, a coating layer configured to increase the optical reflectivity of the optical fibre, the coating layer delimiting, after deposition, the Fabry-Perot cavity.

10. Optical system according to claim 3, wherein at least one of the two optical fibres and the connecting element have a rotationally symmetric shape that is invariant under rotation of a predefined angle about the axis.

* * * * *